United States Patent
LaRue et al.

(10) Patent No.: US 8,087,201 B2
(45) Date of Patent: Jan. 3, 2012

(54) METHOD FOR IRRIGATING AND FERTILIZING RICE

(75) Inventors: Jacob L. LaRue, Omaha, NE (US); Germani Concenco, Uberaba (BR)

(73) Assignee: Valmont Industries, Inc., Omaha, NE (US)

(*) Notice: Subject to any disclaimer, the term of this patent is extended or adjusted under 35 U.S.C. 154(b) by 336 days.

(21) Appl. No.: 12/471,068

(22) Filed: May 22, 2009

(65) Prior Publication Data

US 2010/0294181 A1 Nov. 25, 2010

(51) Int. Cl.
*A01G 25/09* (2006.01)

(52) U.S. Cl. .................................. 47/58.1 FV

(58) Field of Classification Search .............. 47/58.1 FV
See application file for complete search history.

(56) References Cited

U.S. PATENT DOCUMENTS

| | | | |
|---|---|---|---|
| 4,397,421 A | 8/1983 | Schram | |
| 5,078,326 A | 1/1992 | Wright | |
| 5,678,771 A | 10/1997 | Chapman | |
| 5,927,603 A | 7/1999 | McNabb | |
| 6,131,833 A | 10/2000 | Chapman | |
| 6,616,374 B2 | 9/2003 | Starr | |
| 6,666,384 B2 | 12/2003 | Prandi | |
| 6,805,311 B2 | 10/2004 | Buller | |
| 6,820,828 B1 | 11/2004 | Greenwalt | |
| 7,229,032 B1 | 6/2007 | Christensen et al. | |
| 7,311,275 B2 | 12/2007 | Korus | |
| 2001/0019728 A1* | 9/2001 | Basinger et al. | 424/667 |
| 2008/0304711 A1* | 12/2008 | Scharf et al. | 382/110 |
| 2010/0294181 A1* | 11/2010 | Larue et al. | 111/120 |

FOREIGN PATENT DOCUMENTS

| | | |
|---|---|---|
| JP | 03-108437 | 5/1991 |
| JP | 08-336336 | 12/1996 |
| JP | 11-103699 | 4/1999 |
| KR | 2003-070778 | 9/2003 |

OTHER PUBLICATIONS

Traxco S.A., Pivot Irrigation Components, Growing Rice with Center-Pivot Irrigation Saves Water and Fuel, Sep. 16, 2008,http://pivotirrigation.blogspot.com/search/label/growing%20rice%20with%20center-pivot%20.*

Zaratin et al., Effects of Four Potassium Doses on Six Sprinkler Irrigated Rice Upland Cultivars, Cientifica, 2004, pp. 115-120, vol. 32, No. 2, Universidade Estadual Paulista/UNESP, Brazil.

International Rice Institute, Efficiency of Nitrogen Fertilizers for Rice, Proceedings of the Meeting of the International Network on Soil Fertility and Fertilizer Evaluation on Soil Fertility and Fertilizer Evaluation for Rice, 1987, pp. 120.

Humphreys et al., The Growth and Nitrogen Economy of Rice Under Sprinkler and Flood Irrigation in South East Australia, Irrigation Science, 1989, pp. 201-213, vol. 10, Springer-Verlag, Abstract only.

Humphreys et al., The Growth and Nitrogen Economy of Rice Under Sprinkler and Flood Irrigation in South East Australia, Irrigation Science, 1989, pp. 281-292, vol. 10, Springer-Verlag, Abstract only.

Akkari et al., Herbicides and Seeding Rate Effects on Sprinkler-Irrigated Rice, Agronomy Journal, 1986, American Society of Agronomy.

Humphreys et al., Research Solutions to Watertable and Salinity Problems in the Rice Growing Areas of Southern Australia, The University of Sydney Library, Sydney eScholarship Repository, 2005, http://hdl.handle.net/2123/120, Abstract only.

Soil and Water Management Rice Irrigation-Methods, University of Arkansas Division of Agriculture, 2006, http://www.aragriculture.org/soil_water/irrigation/crop/Rice/methods.htm.

Arf et al., Soil Management and Bitrogen Fertilization for Sprinkler-Irrigated Upland Rice Cultivars, Scientia Agricola, 2003, vol. 60, No. 2, Piracicaba, Brazil http://www.scielo.br/scielo.php?script=sci_arttext&pid=S0103=90162003000200020.

McCauley et al., Sprinkler Irrigation as an Energy- and Water-Saving Approach to Rice Production and Management of Riceland Pests. Technical Report., Energy Citations Database (ECD) Document #5040106, 1985, United States, Abstract only.

Water Use Efficiency and Economic Feasibility of Growing Rice and Wheat With Sprinkler Irrigation in the Indus Basin in Pakistan, Agricultural Water Management, 2007, vol. 87, Issue 3, pp. 292-298, Abstract only.

* cited by examiner

*Primary Examiner* — Frank T Palo
(74) *Attorney, Agent, or Firm* — Advent IP, P.C., L.L.O.

(57) ABSTRACT

A method for irrigating and fertilizing rice using a sprinkler irrigation system. The method includes the steps of providing a sprinkler irrigation system, determining an amount of water to be applied to the rice, determining an amount of fertilizer to be applied to the rice, and applying the water and fertilizer to the rice through the sprinkler irrigation system. Depending upon rainfall, the irrigation water may be applied to the rice an average of about one to two times per week between its planting and emergence, about two to three times per week between its emergence and its panicle initiation stage, about three to five times per week between its panicle initiation stage and its initial ripening stage, and about three to four times per week between the rice's initial ripening stage and its harvest.

26 Claims, No Drawings

METHOD FOR IRRIGATING AND FERTILIZING RICE

CROSS-REFERENCE TO RELATED APPLICATIONS

None.

BACKGROUND OF THE INVENTION

Rice is one of the world's most fundamental food crops. Historically, rice was considered to require relatively large amounts of water, in comparison with other types of grains, as part of its traditional production process. With water shortages becoming ever more frequent in many rice-producing regions around the world, efforts have been made to explore other growing techniques in order to reduce the overall water requirements, improve production, and increase overall economic return.

Traditional methods of growing rice include the use of vast quantities of water (e.g., 900 to 2290 mm (35 to 90 inches) of water per growing season) to flood irrigate rice fields or paddies. The rice fields are typically divided into individual units which are bermed and contoured to control water movement across the field. Once flooded, the rice fields normally remain flooded throughout the remainder of the growing season. While some of the water is consumed by the crop, the vast majority of it is used as a form of weed control. The rice plants will survive under saturated conditions, while many weed species will not. Typical rice growing production steps include heavy tillage, leveling, surface smoothing, channel preparation, berm construction, planting, flood irrigating, draining and harvesting. While traditional methods of growing rice have a long proven history, the soil and land management components can be costly and the volume of water needed for their successful implementation may be limiting in many areas. Additionally, because of their flood irrigation aspects, these traditional methods are limited to areas having flat terrain, particularly flat terrain adjacent rivers and streams.

While rice producers have attempted to grow rice utilizing sprinkler irrigation systems in the past, very little has been known with regard to growing rice in this way, including when and how much water to apply. Additionally, little has been known with regard to the selection of the type of rice seed, the application of fertilizer, the application of pesticides and the sprinkler irrigation system used to apply the water, fertilizer and pesticides.

Accordingly, a need exists for a method of growing rice utilizing a sprinkler irrigation system wherein the irrigation applications are applied in amounts and at times to optimize the efficiency of the water applied. A need also exists for a method of growing rice utilizing a sprinkler irrigation system wherein fertilizer and pesticide are applied in amounts and at times optimal for curtailing unwanted weeds and other constraints to rice production. A further need exists for a method of growing rice utilizing a sprinkler irrigation system wherein the sprinkler irrigation system is configured for applying irrigation, fertigation and chemigation to rice.

SUMMARY OF THE INVENTION

One embodiment of the present invention is directed to a method for irrigating and fertilizing rice using a sprinkler irrigation system. The method includes the steps of providing a sprinkler irrigation system, determining an amount and timing of water to be applied to the rice, determining an amount and timing of fertilizer to be applied to the rice, and applying the water and fertilizer to the rice through the sprinkler irrigation system.

Depending upon rainfall, the irrigation water may be applied to the rice an average of about one to two times per week between its planting and its emergence from the soil's surface, about two to three times per week between its emergence and its panicle initiation stage, and about three to five times per week between its panicle initiation stage and its initial ripening stage. Irrigation water may also be applied about three to four times per week between the rice's initial ripening stage and its harvest.

The combination of the rainfall and irrigation may be such that the rice receives an average of between about 6 and 25 mm (¼ and 1 inch) of water per week between its planting and its emergence from the soil's surface, an average of between about 13 and 75 mm (½ inch and 3 inches) of water per week between its emergence and its panicle initiation stage, an average of between about 19 and 102 mm (¾ inch and 4 inches) of water per week between its panicle initiation stage and its initial ripening stage, and an average of between about 13 and 89 mm (½ inch and 3½ inches) of water per week between its initial ripening stage and its harvest.

Thus, in order to optimize the amount of water applied to the rice, applications of between about 6 and 13 mm (¼ and ½ inch) of water are applied one to two times per week between the rice's planting and its emergence from the soil's surface, applications of between about 6 and 19 mm (¼ and ¾ inch) are applied two to three times per week between its emergence and its panicle initiation stage, applications of between about 6 and 19 mm (¼ and ¾ inch) are applied three to five times per week between its panicle initiation stage and its initial ripening stage, and applications of between about 6 and 19 mm (¼ and ¾ inch) of water are applied two to four times per week between its initial ripening stage and its harvest.

DETAILED DESCRIPTION OF THE INVENTION

The present invention involves a method for growing rice using a sprinkler irrigation system. While rice is traditionally grown in flooded fields or paddies, the present invention involves growing rice in non-flooded fields and utilizing a sprinkler irrigation system to apply water, fertilizer and pesticides. The method of the present invention not only reduces the energy and costs associated with producing rice, but can also lead to an increase in yields.

Sprinkler Irrigation System

The sprinkler irrigation system used in the present invention may be a center pivot unit, or alternatively, a linear move unit. The sprinkler irrigation system may be self-propelled. Additionally, the sprinkler irrigation system may be permanently fixed in one field or may have the ability to be transferred or towed between multiple fields.

Center pivot and linear move irrigation systems normally utilize a plurality of spaced-apart drive assemblies or towers that support an elongated pipeline which moves over the area to be irrigated. Irrigation systems of this type typically include flexible hoses or "drops" which depend downwardly from the pipeline and terminate in a sprinkler or nozzle. In this case, where the irrigation system is used on rice, the drops are configured to extend to a point between about 1.2 and 1.8 m (4 and 6 ft.) above the ground. The sprinklers attached to the ends of the drops may be rotator sprinklers that are designed to operate at pressures between about 0.41 and 1.38 bars and may include 'rice' pads. In order to control the pressure under which the sprinklers operate, they may include pressure regulators.

For reasons set forth in more detail below, the sprinklers may be configured to minimize or eliminate the amount of water applied directly into the wheel or track path areas of the irrigation system. Normally, the rotator sprinklers have a full circular spray pattern. However, in order to reduce or eliminate the amount of water applied in the wheel paths, the sprinklers located adjacent the wheel paths may have a spray pattern that is less than a full circular spray pattern, for example, a half-circular spray pattern. Alternatively, directional spray nozzles may be placed in lieu of the rotator sprinklers adjacent the wheel paths. To further aid in the reduction of water from the wheel or track path areas, the sprinklers and/or spray nozzles may be mounted onto "boom-backs" so that the water is applied behind the pipeline.

Depending upon the region in which the rice is grown, the sprinkler irrigation system is capable of delivering, at a minimum, between about 7 and 12 mm (¼ and ½ inch) of water to the ground in a 24-hour period. In regions having moderately hot and humid climates, the irrigation system should be able to deliver at least 7 mm (¼ inch) per every 24 hours and in regions having hot and dry climates, the irrigation system should be able to deliver at least 12 mm (½ inch) per every 24 hours.

As described in further detail below, the irrigation system is also utilized to apply fertilizer, pesticides and other chemicals through "fertigation" or "chemigation." The pesticides may include herbicides, insecticides and fungicides. In doing so, the irrigation system should have the ability to deliver a range of about 4.7 to 94 liters per hour per hectare (0.5 to 10 gallons per hour per acre) of fertilizer and/or pesticide. The delivery of the fertilizer and pesticide may be automated by the irrigation system.

The drive assemblies of an irrigation system normally include wheels for propelling the irrigation system about the field. Due to the weight of the irrigation system, the weight of the water within the system and soggy soil conditions, rutting is often caused along the wheels' travel paths due to the higher amount of water applied to the rice crops as compared to other highland crops. This rutting has numerous adverse impacts, one of which is loss of traction by the wheels. The irrigation system utilized in the present invention includes numerous design characteristics to alleviate or reduce the rutting and traction problems when irrigating rice with a self-propelled center pivot or linear system. First, the system's drive assemblies may be designed with traction and floatation in mind and include wide wheels, multiple wheels, dual wheels or tracks in order to provide a relatively large ground engaging surface area so as to distribute the weight of the system and reduce the pressure applied to the ground. The large surface area provides the drive assemblies the ability to resist sinking into the soil and creating ruts. Second, as mentioned above, the system's sprinklers may be configured to minimize the application of water directly into the wheel or track path areas. In doing so, the sprinklers located adjacent the wheel paths may have a half-circular spray pattern, or alternatively, be replaced with directional spray nozzles that direct the water away from the wheel paths. Again, the sprinklers and/or spray nozzles may also be mounted onto "boom-backs" so that the water is applied behind the pipeline.

Rice Seed

Traditionally, rice is grown in flooded fields or paddies. Once flooded, the rice fields normally remain flooded throughout the remainder of the growing season. While some of this water is consumed by the crop, the vast majority of it is used as a form of weed control. However, because the method of the present invention does not involve the flooding of the rice fields, particular attention is drawn to the type of rice that is grown. In general, a producer selects from a variety or a hybrid (formed by the crossbreeding two different varieties). For example, a grower may select varieties or hybrids, such as Cybonnet, Clearfield 171 or RiceTec CLXL745, to name a few.

In one embodiment, the type of rice used in connection with the present invention is one that is selected for its favorable blast resistance, rooting and tillering characteristics. Because the rice field is not flooded, the type of rice used should be one that is relatively well suited to rapidly develop a canopy in order to shade out competing weeds. Thus, the type of rice used may be one that develops many leaves by a relatively early date in the growing season.

The rice seeds can be treated with pesticides, such as fungicides and/or insecticides, prior to their planting. For example, the seeds may be pre-treated with vitavax-thiram (carboxym+thiram) or vitavax-thiram+micronutrients complex.

The type of rice chosen will dictate the seeding rate. For example, varieties may have one seeding rate, while hybrids may have a different seeding rate. The seeding rate will also depend on the rice's tillering capacity and leaf production characteristics, and in one embodiment, the seeding rate is between about 28 and 180 kg/hectare (25 and 161 lb/acre). In an alternative embodiment, the seeding rate is between about 84 and 123 kg/hectare (75 and 110 lb/acre). In fact, in many cases, the seeding rate for rice grown under the method of the present invention is less than the seeding rate for rice grown in a flooded field or paddy, thereby reducing overall production costs. The rice may be broadcast or drilled into the ground. If drilled, the spacing between the rows will usually be between 12 and 25 cm (5 and 10 inches).

Irrigation

As set forth above, the method of the present invention involves applying water to the rice using a sprinkler irrigation system. The amount and timing of the water applications is dependent upon several external factors including rainfall, climate conditions, the rice's growth stage, soil type (e.g., sand, silt, clay) and soil moisture content. A producer may consider some or all of these factors when determining the amount and timing of the water applications. The growth stages of rice are described and demonstrated in "Scale of Rice Growth Stages" by Counce et al. (2000), which categorizes the growth stages of rice into seed stages ($S_0$ to $S_3$), vegetative stages ($V_1$ to $V_{13}$) and reproductive stages ($R_0$ to $R_9$). For clarity purposes, some of Counce et al.'s growth stage nomenclature is referred to herein.

In one embodiment, water is applied to the rice about one to two times per week between its planting ($S_0$) and its emergence from the soil's surface (approx. $S_3$), about two to three times per week between its emergence (approx. $S_3$) and its panicle initiation stage (approx. $R_0$), about three to five times per week between its panicle initiation stage (approx. $R_0$) and its initial ripening stage (approx. $R_6$ or $R_7$), and about three to four times per week between its initial ripening stage (approx. $R_6$ or $R_7$) and its harvest (approx. $R_8$ or $R_9$). The water applied between the initial ripening stage and the harvest can be beneficial to prevent the fast drying of the rice grains, which can contribute to the grains' breakage during milling. Alternative embodiments can be described by defining the amounts of water applied between other growth stages. For example, in one of these embodiments, water is applied to the rice about one to two times per week between its planting ($S_0$) and its emergence from the soil's surface (approx. $S_3$), about two to three times per week between its emergence (approx. $S_3$) and its flag leaf stage (approx. $V_{13}$), about three to five times per week between its flag leaf stage (approx. $V_{13}$) and its panicle emergence stage (approx. $R_3$), and about two to four times per week between its panicle emergence stage (approx. $R_3$) and its maturity (approx. $R_9$).

The combination of the rainfall and irrigation may be such that the rice receives an average of between about 6 and 25 mm (¼ and 1 inch) of water per week between its planting ($S_0$) and its emergence from the soil's surface (approx. $S_3$), an average of between about 13 and 75 mm (½ inch and 3 inches) of water per week between its emergence (approx. $S_3$) and its panicle initiation stage (approx. $R_0$), an average of between about 19 and 102 mm (¾ inch and 4 inches) of water per week between its panicle initiation stage (approx. $R_0$) and its initial ripening stage (approx. $R_6$ or $R_7$), and an average of between about 13 and 89 mm (½ inch and 3½ inches) of water per week between its initial ripening stage (approx. $R_6$ or $R_7$) and its harvest (approx. $R_8$ or $R_9$). Of course, the combination of the rainfall and irrigation may fall within any of the ranges disclosed in the previous sentence. For example, the rice may receive an average of between about 13 and 19 mm (½ and ¾ inch) of water per week between its planting ($S_0$) and its emergence from the soil's surface (approx. $S_3$), an average of between about 25 and 51 mm (1 and 2 inches) of water per week between its emergence (approx. $S_3$) and its panicle initiation stage (approx. $R_0$), an average of between about 51 and 76 mm (2 and 3 inches) of water per week between its panicle initiation stage (approx. $R_0$) and its initial ripening stage (approx. $R_6$ or $R_7$), or an average of between about 38 and 64 mm (1½ and 2½ inches) of water per week between its initial ripening stage (approx. $R_6$ or $R_7$) and its harvest (approx. $R_8$ or $R_9$).

In an alternative embodiment, the combination of the rainfall and irrigation is such that the rice receives an average of between about 6 and 25 mm (¼ and 1 inch) of water per week between its planting ($S_0$) and its emergence from the soil's surface (approx. $S_3$), an average of between about 13 and 75 mm (½ inch and 3 inches) of water per week between its emergence (approx. $S_3$) and its flag leaf stage (approx. $V_{13}$), an average of between about 19 and 102 mm (¾ inch and 4 inches) of water per week between its flag leaf stage (approx. $V_{13}$) and its panicle emergence stage (approx. $R_3$), and an average of between about 13 and 89 mm (½ inch and 3½ inches) of water per week between its panicle emergence stage (approx. $R_3$) and its maturity (approx. $R_9$). Again, the combination of the rainfall and irrigation may fall within any of the ranges disclosed in the previous sentence. For example, the rice may receive an average of between about average of between about 13 and 19 mm (½ and ¾ inch) of water per week between its planting ($S_0$) and its emergence from the soil's surface (approx. $S_3$), an average of between about 25 and 51 mm (1 and 2 inches) of water per week between its emergence (approx. $S_3$) and its flag leaf stage (approx. $V_{13}$), an average of between about 51 and 76 mm (2 and 3 inches) of water per week between its flag leaf stage (approx. $V_{13}$) and its panicle emergence stage (approx. $R_3$), or an average of between about 38 and 64 mm (1½ and 2½ inches) of water per week between its panicle emergence stage (approx. $R_3$) and its maturity (approx. $R_9$).

Therefore, in one embodiment, in order to optimize the amount of water applied to the rice, applications of between about 6 and 13 mm (¼ and ½ inch) of water are applied one to two times per week between the rice's planting ($S_0$) and its emergence from the soil's surface (approx. $S_3$), applications of between about 6 and 19 mm (¼ and ¾ inch) are applied two to three times per week between its emergence (approx. $S_3$) and its panicle initiation stage (approx. $R_0$), applications of between about 6 and 19 mm (¼ and ¾ inch) are applied three to five times per week between its panicle initiation stage (approx. $R_0$) and its initial ripening stage (approx. $R_6$ or $R_7$), and applications of between about 6 and 19 mm (¼ and ¾ inch) of water are applied two to four times per week between its initial ripening stage (approx. $R_6$ or $R_7$) and its harvest (approx. $R_8$ or $R_9$). In an alternative embodiment, applications of between about 6 and 13 mm (¼ and ½ inch) of water are applied one to two times per week between the rice's planting ($S_0$) and its emergence from the soil's surface (approx. $S_3$), applications of between about 6 and 19 mm (¼ and ¾ inch) are applied two to three times per week between its emergence (approx. $S_3$) and its flag leaf stage (approx. $V_{13}$), applications of between about 6 and 19 mm (¼ and ¾ inch) are applied three to five times per week between its flag leaf stage (approx. $V_{13}$) and its panicle emergence stage (approx. $R_3$), and applications of between about 6 and 19 mm (¼ and ¾ inch) of water are applied two to four times per week between its panicle emergence stage (approx. $R_3$) and its maturity (approx. $R_9$).

In some cases, the total amount of water (including rainwater and irrigation water) applied to the rice over the growing season can be between approximately 500 and 630 mm (20 and 25 inches), as compared to the 900 to 2,300 mm (35 and 90 inches) of water that is applied when growing rice in a flooded field or paddy. The irrigation water can be curtailed during periods of rain and can even be applied on a site-specific basis. The decreases in water consumption lead to a lower production cost of the rice.

Fertilization

Traditionally, when rice is grown in flooded fields, fertilizers such as nitrogen are applied immediately prior to the fields' flooding. These fertilizers normally contain nitrogen in ammonium form or nitrate form. If and when additional nitrogen is required during the growing season, it has been applied in one or two topdress applications mid-season via ground equipment or an airplane. While nitrogen is the primary nutrient applied, phosphorus and potassium are also sometimes applied, dependent up soil conditions. Where phosphorus and potassium are applied, they are usually applied prior to the planting of the rice, or at the latest, prior to the flooding of the field.

However, in the method of the present invention, where the rice fields are not flooded, the fertilizer applications may vary. While a portion of the fertilizer may still be applied in a substantially dry form (e.g., urea) prior to the emergence of the rice, a portion of the fertilizer can also be applied through "fertigation" via the sprinkler irrigation system. Fertigation is the application of fertilizer through an irrigation system. Dependent on a number of external factors, such as soil fertility, the producer will determine the amount and timing of the fertilization treatments.

When the fertilizer applications are split between pre-emergence dry applications and post-emergence fertigation applications, between about 20-40% of the total amount nitrogen can be applied pre-emergence and between about 60-80% of the total amount of nitrogen can be applied post-emergence through fertigation. The pre-emergence applications take place at a time in close proximity to the planting of the rice. For example, a dry nitrogen fertilizer, such as urea or ammonium sulfate, can be applied simultaneously with the planting of the rice seed or can be broadcast on the field shortly before or after the planting of the rice. Alternatively, anhydrous ammonia can be injected into the ground prior to the planting of the rice.

The fertilizer applied to the rice through fertigation may either be in a liquid form or a suspension form. In some countries such as the United States, liquid nitrogen fertilizer (28-32% N) is commonly available. However, in other countries, liquid nitrogen fertilizer is not as readily available. In those countries, growers have to purchase dry fertilizer, such as urea or ammonium nitrate, and mix that dry fertilizer with water. The dry fertilizer becomes suspended in the water and can be applied to the rice through the sprinkler irrigation system. In addition to nitrogen, the fertigation applications may also contain other major nutrients and micronutrients such as zinc, copper, iron, chloride, sulfur, manganese, molybdenum, nickel and boron.

Pesticides

Traditionally, when rice is grown in flooded fields, pesticides such as herbicides, insecticides and fungicides, are applied either pre-flood or post-flood. When irrigating the rice with a sprinkler irrigation system, as opposed to flooding, the layer of water covering the field is not present. Because that layer of water, which acts as a means for controlling weeds, is eliminated, special attention is given to the amount and timing of the herbicide applications, particularly the applications administered during the early portions of the growing season. Typically, more herbicide is required during the pre-emergence stage and in the early portions of the growing season until the rice crop is able to develop enough canopy to shade out competing weeds.

In one embodiment of the present invention, a portion of the herbicide is applied prior to emergence of the rice and a portion of the herbicide is applied after emergence of the rice. The type of herbicide that is applied will depend upon whether it is applied pre-emergence or post-emergence and the particular rice variety or hybrid, as well as the weed species present. The pesticides, including the herbicide, may be applied through "chemigation." Chemigation is the application of a chemical through an irrigation system.

In addition to herbicide, other pesticides may include insecticides and fungicides. A fungicide may be applied in order to control blast, which is a fungal disease that can infect and produce lesions on the leaves, leaf collars, stems, panicles and grains of the rice, thereby decreasing productions yields. In order to reduce the chances of blast, in one embodiment, fungicide is applied as needed from an early boot stage through a 10% heading stage.

Ground

The method of the present invention allows rice to be grown on terrain upon which it would otherwise not be grown. Because flood irrigation is replaced with a sprinkler irrigation system, the rice can be grown on hilly terrain. Since channels and berms associated with flood irrigation are no longer needed, the total surface area of crop production is increased.

In the present method, since the rice fields do not have to be prepared and leveled for flooding, the rice can be grown without intense soil tillage and surface preparation. Therefore, minimal tillage techniques can be employed, which not only reduces production costs, but also results in an increase of organic matter in the soil which reduces erosion and is protective of the soil's tilth and productivity. By minimizing surface preparation requirements and improving harvesting speeds (the harvest can be completed quicker since the soil is not saturated by flood irrigation), a double crop rotation is possible in areas with extended growing seasons. For example, a soybean crop may be grown following the rice's harvest during the same year. The reduction in soil preparation and water pumping requirements result in significant energy savings, thereby further reducing the rice's production costs. Another option may be planting the rice immediately after the harvest of a small grain cash crop such as wheat, since little to no soil preparation is required and it is easy to apply irrigation to the crop to initiate germination.

From the foregoing, it may be seen that the method of the present invention is particularly well suited for the proposed usages thereof. Furthermore, since certain changes may be made in the above invention without departing from the scope hereof, it is intended that all matter contained in the above description be interpreted as illustrative and not in a limiting sense. It is also to be understood that the following claims are to cover certain generic and specific features described herein.

What is claimed is:

1. A method for irrigating and fertilizing rice using a sprinkler irrigation system, said method comprising the steps of:
providing a sprinkler irrigation system;
determining an amount of water to be applied to the rice based on external factors;
determining an amount of fertilizer to be applied to the rice based on external factors;
applying water to the rice through said sprinkler irrigation system wherein, between a combination of irrigation water and rainwater, the rice receives an average of between about 6 and 25 mm of water per week between its planting and its emergence from the soil's surface, an average of between about 13 and 75 mm of water per week between said emergence and its panicle initiation stage, an average of between about 19 and 102 mm of water per week between said panicle initiation stage and its initial ripening stage; and
applying a fertilizer to the rice through said sprinkler irrigation system.

2. The method of claim 1 wherein said sprinkler irrigation system is selected from one of a center pivot unit and a linear move unit.

3. The method of claim 2 wherein said sprinkler irrigation system is configured to minimize the application of water directly to a wheel track area.

4. The method of claim 3 wherein said sprinkler irrigation system includes rotator sprinkler units and the sprinkler units positioned adjacent drive units of said sprinkler irrigation system have a half-circle pattern.

5. The method of claim 3 wherein said sprinkler irrigation system includes at least one of a rotator sprinkler unit and a directional spray nozzle and at least one of said rotator sprinkler unit and directional spray nozzle is mounted to a boomback adjacent a drive unit of said sprinkler irrigation system.

6. The method of claim 1 wherein the amount of water applied to the rice is dependent upon climatic conditions, crop growth stage, soil moisture content and rainfall.

7. The method of claim 1 wherein between the combination of irrigation water and rainwater, the rice receives an average of between about 13 and 89 mm of water per week between said initial ripening stage and its harvest.

8. The method of claim 1 wherein the water is applied to the rice about one to two times per week between said planting and said emergence, about two to three times per week between said emergence and said panicle initiation stage, and about three to five times per week between said panicle initiation stage and said initial ripening stage.

9. The method of claim 1 wherein applications of between about 6 and 13 mm of water are applied to the rice one to two times per week between said planting and said emergence, applications of between about 6 and 19 mm are applied two to three times per week between said emergence and said panicle initiation stage, applications of between about 6 and 19 mm are applied three to five times per week between said panicle initiation stage and said initial ripening stage.

10. The method of claim 1 wherein a portion of said fertilizer is applied in a substantially dry form prior to emergence of the rice and a portion of said fertilizer is applied in a suspension form after emergence of the rice.

11. The method of claim 1 wherein a portion of said fertilizer is applied in a substantially dry form prior to emergence of the rice and a portion of said fertilizer is applied in a liquid form after emergence of the rice.

12. The method of claim 1 wherein said fertilizer contains nitrogen, major nutrients and micronutrients.

13. The method of claim 12 wherein between about 20-40% of the total amount nitrogen is applied at a time in close proximity with the planting of the rice and between about 60-80% of the total amount of nitrogen is applied after the planting of the rice in one of a liquid form and a suspension form through said sprinkler irrigation system.

14. The method of claim 1 further including the step of applying a pesticide.

15. The method of claim 14 wherein said pesticide is a herbicide.

16. The method of claim 15 wherein a portion of said herbicide is applied prior to emergence of the rice and a portion of said herbicide is applied after emergence of the rice.

17. The method of claim 14 wherein said pesticide is a fungicide and is applied as needed from an early boot stage through a 10% heading stage.

18. The method of claim 1 wherein said external factors include at least one of soil type, soil moisture conditions, soil fertility conditions, type of rice, and average rainfall during the rice's growing season.

19. The method of claim 1 further including the step of selecting a type of rice seed.

20. The method of claim 19 wherein said type of rice seed is selected from at least one of a hybrid and a variety.

21. The method of claim 20 wherein said hybrid and variety have blast resistant and aggressive rooting and tillering characteristics.

22. The method of claim 19 wherein the rice is seeded at a rate between approximately 28 and 180 kg/hectare, dependent upon whether rice is a hybrid or variety.

23. The method of claim 19 wherein said rice seed is drilled.

24. A method for irrigating and fertilizing rice using a sprinkler irrigation system, said method comprising the steps of:
   providing a sprinkler irrigation system;
   determining an amount of water to be applied to the rice based on external factors;
   determining an amount of fertilizer to be applied to the rice based on external factors;
   applying water to the rice through said sprinkler irrigation system wherein, between the combination of irrigation water and rainwater, the rice receives an average of between about 6 and 25 mm of water per week between its planting and its emergence from the soil's surface, an average of between about 13 and 75 mm of water per week between said emergence and its flag leaf stage, an average of between about 19 and 102 mm of water per week between said flag leaf stage and its panicle emergence stage, and an average of between about 13 and 89 mm of water per week between said panicle emergence stage and its maturity; and
   applying a fertilizer to the rice through said sprinkler irrigation system.

25. A method for growing rice using a sprinkler irrigation system, said method comprising the steps of:
   providing a sprinkler irrigation system including rotating sprinkler units, wherein said sprinkler units positioned adjacent drive units of said sprinkler irrigation system have a half-circle pattern;
   determining an amount of water to be applied to the rice based on external factors;
   determining an amount of fertilizer to be applied to the rice based on external factors;
   applying water to the rice through said sprinkler irrigation system wherein, subject to rainfall, applications of between about 6 and 13 mm of water are applied to the rice one to two times per week between its planting and its emergence from the soil's surface, applications of between about 6 and 19 mm are applied two to three times per week between said emergence and a panicle initiation stage, and applications of between about 6 and 19 mm are applied three to five times per week between said panicle initiation stage and a initial ripening stage; and
   applying a fertilizer to the rice through said sprinkler irrigation system.

26. The method of claim 25 wherein subject to rainfall, applications of between about 6 and 19 mm of water are applied two to four times per week between said initial ripening stage and the rice's harvest.

* * * * *

US008087201C1

(12) INTER PARTES REEXAMINATION CERTIFICATE (490th)

United States Patent
LaRue et al.

(10) Number: US 8,087,201 C1
(45) Certificate Issued: Nov. 21, 2012

(54) METHOD FOR IRRIGATING AND FERTILIZING RICE

(75) Inventors: Jacob L. LaRue, Omaha, NE (US); Germani Concenco, Uberaba (BR)

(73) Assignee: Valmont Industries, Inc., Omaha, NE (US)

Reexamination Request:
No. 95/001,993, May 16, 2012

Reexamination Certificate for:
Patent No.: 8,087,201
Issued: Jan. 3, 2012
Appl. No.: 12/471,068
Filed: May 22, 2009

(51) Int. Cl.
*A01G 25/09* (2006.01)
(52) U.S. Cl. .................................. 47/58.1 FV
(58) Field of Classification Search .......... None
See application file for complete search history.

(56) References Cited

To view the complete listing of prior art documents cited during the proceeding for Reexamination Control Number 95/001,993, please refer to the USPTO's public Patent Application Information Retrieval (PAIR) system under the Display References tab.

*Primary Examiner* — Jeffrey L. Gellner

(57) ABSTRACT

A method for irrigating and fertilizing rice using a sprinkler irrigation system. The method includes the steps of providing a sprinkler irrigation system, determining an amount of water to be applied to the rice, determining an amount of fertilizer to be applied to the rice, and applying the water and fertilizer to the rice through the sprinkler irrigation system. Depending upon rainfall, the irrigation water may be applied to the rice an average of about one to two times per week between its planting and emergence, about two to three times per week between its emergence and its panicle initiation stage, about three to five times per week between its panicle initiation stage and its initial ripening stage, and about three to four times per week between the rice's initial ripening stage and its harvest.

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-26 are cancelled.

* * * * *